(12) United States Patent
Nakahira et al.

(10) Patent No.: US 11,641,659 B2
(45) Date of Patent: *May 2, 2023

(54) RADIO COMMUNICATION METHOD, CENTRALIZED CONTROL STATION, AND BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Akiyoshi Inoki, Musashino (JP); Keisuke Wakao, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 16/976,458

(22) PCT Filed: Feb. 25, 2019

(86) PCT No.: PCT/JP2019/007043
§ 371 (c)(1),
(2) Date: Nov. 23, 2020

(87) PCT Pub. No.: WO2019/167881
PCT Pub. Date: Sep. 6, 2019

(65) Prior Publication Data
US 2021/0076369 A1   Mar. 11, 2021

(30) Foreign Application Priority Data
Mar. 2, 2018  (JP) .............................. JP2018-038015

(51) Int. Cl.
*H04W 72/04* (2023.01)
*H04W 72/51* (2023.01)
(Continued)

(52) U.S. Cl.
CPC ........... *H04W 72/51* (2023.01); *H04W 28/16* (2013.01); *H04W 72/53* (2023.01); *H04W 72/541* (2023.01); *H04L 5/0023* (2013.01)

(58) Field of Classification Search
None
See application file for complete search history.

(56) References Cited

U.S. PATENT DOCUMENTS

| 2012/0134279 A1 | 5/2012 | Tamaki |
| 2012/0179810 A1 | 7/2012 | Contreras Delpiano et al. |

(Continued)

FOREIGN PATENT DOCUMENTS

| JP | 2009246476 A | 10/2009 |
| JP | 2013197820 A | 9/2013 |

(Continued)

OTHER PUBLICATIONS

IEEE Std 802.11ac-2013, Dec. 2013.
(Continued)

*Primary Examiner* — Willie J Daniel, Jr.
(74) *Attorney, Agent, or Firm* — Harness, Dickey & Pierce, P.L.C.

(57) ABSTRACT

[Problem] A base station includes a plurality of radio communication units individually supporting a plurality of communication capabilities, and controls a terminal station to be connected with the base station to select a radio communication unit according to a communication scheme of the terminal station.

[Solution] Provided is a radio communication method of a radio communication system. The radio communication system includes a plurality of base stations mounted with a plurality of radio communication units for which different communication schemes are settable, a terminal station configured to perform radio communication in a certain communication scheme, and a centralized control station configured to control the plurality of base stations. The radio communication method includes calculating, by the centralized control station, a setting policy of a communication scheme for each of the plurality of radio communication units of each of the plurality of base stations and a switching policy for the terminal station and the radio communication unit, and notifying the base station of the policies, setting, by the base station, the setting policy and the switching policy, notified from the centralized control station, for the radio communication unit, collecting, by the base station, communication scheme information of communication schemes (Continued)

selectable by the terminal station from the terminal station to be connected, and selecting, by the base station, a radio communication unit to be connected by the terminal station in accordance with the communication scheme information, the setting policy, and the switching policy.

9 Claims, 8 Drawing Sheets

(51) Int. Cl.
  *H04W 28/16* (2009.01)
  *H04W 72/53* (2023.01)
  *H04W 72/541* (2023.01)
  *H04L 5/00* (2006.01)

(56) References Cited

U.S. PATENT DOCUMENTS

| | | | |
|---|---|---|---|
| 2014/0113640 A1 | 4/2014 | Sachs et al. | |
| 2015/0055572 A1 | 2/2015 | Ishikura et al. | |
| 2016/0315738 A1 | 10/2016 | Huang et al. | |
| 2017/0034710 A1 | 2/2017 | Shu et al. | |
| 2021/0007045 A1* | 1/2021 | Murakami | H04B 7/0689 |

FOREIGN PATENT DOCUMENTS

| | | |
|---|---|---|
| JP | 2014507089 A | 3/2014 |
| JP | 2015211237 A | 11/2015 |
| WO | WO-2012097102 A1 | 7/2012 |

OTHER PUBLICATIONS

International Search Report (English and Japanese) issued in PCT/JP2019/007043, dated May 28, 2019; ISA/JP.
International Search Report (English and Japanese) issued in PCT/JP2019/007042, dated May 28, 2019; ISA/JP.

* cited by examiner

RADIO COMMUNICATION METHOD, CENTRALIZED CONTROL STATION, AND BASE STATION

CROSS-REFERENCE TO RELATED APPLICATIONS

This application is a 371 U.S. National Phase of International Application No. PCT/JP2019/007043, filed on Feb. 25, 2019, which claims priority to Japanese Application No. 2018-038015, filed on Mar. 2, 2018. The entire disclosures of the above applications are incorporated herein by reference.

TECHNICAL FIELD

The present invention relates to a radio communication method, a centralized control station, and a base station, in which the base station includes a plurality of radio communication units individually supporting a plurality of communication capabilities, and controls a terminal station to be connected with the base station to select a radio communication unit according to a communication scheme of the terminal station.

BACKGROUND ART

High-speed radio access systems using radio waves in 5 GHz band include systems based on the IEEE 802.11a standard, the IEEE 802.11n standard, and the IEEE 802.11ac standard. In the IEEE 802.11a standard, a transmission rate of up to 54 Mbit/s is achieved by stabilizing characteristics in a multipath fading environment based on the orthogonal frequency division multiplexing (OFDM) modulation scheme. In the IEEE 802.11n standard, a transmission rate of up to 600 Mbit/s is achieved by using Multiple Input Multiple Output (MIMO) in which a plurality of antennas are used to perform space division multiplexing on an identical radio channel, and a channel bonding technique in which two 20 MHz frequency channels are simultaneously used to utilize 40 MHz frequency channel. In the IEEE 802.11ac standard, higher speed and more efficient radio communication than the IEEE 802.11n standard is achieved by utilizing a channel bonding technique in which up to eight 20 MHz frequency channels are simultaneously used to utilize up to 160 MHz frequency channel, a downlink multi-user MIMO technology in which different signals are simultaneously transmitted to a plurality of destinations on an identical radio channel, and the like (Non Patent Literature 1).

Now, a formulation of IEEE 802.11ax standard has also been advanced, which focuses on improvement of transmission efficiency in addition to increase in transmission rate. In the IEEE 802.11ax standard, it is planned that spatial frequency reuse utilizing simultaneous transmission is enhanced, efficiency of the OFDM modulation scheme is improved, and uplink and downlink OFDMA transmission and uplink multi-user MIMO transmission are employed for multi-user transmission.

Moreover, in high-speed radio access systems based on the standards described above, standard formulation has been advanced while extending the old standards to maintain backward compatibility, and thus, many products not only support the latest standard but also are compatible with the old standards. This allows a radio station supporting the latest standard and a radio station supporting only the old standards to communicate with each other.

CITATION LIST

Non Patent Literature

Non Patent Literature 1: IEEE Std 802.11ac-2013, December 2013.

SUMMARY OF THE INVENTION

Technical Problem

In an actual communication environment in which terminal stations supporting different standards and communication schemes coexist, a radio base station mounted with radio communication units capable of supporting a plurality of standards and communication schemes is disposed, and thus, radio communication is performed among the terminal stations. In such a coexisting environment, in order to secure backward compatibility, a radio frame based on the old standards may be used even when a radio frame based on a new standard can be used. That is, a high-efficiency radio frame defined based on the new standard may not be used.

For example, in simultaneous transmission in radio stations based on the IEEE 802.11ax standard, transmission can be started only when a signal addressed to a radio station supporting the IEEE 802.11ax standard arrives as an interference wave, and simultaneous transmission cannot be started for radio frames based on conventional standards. That is, there is a problem in that in an environment in which radio stations supporting older standards coexist, the transmission efficiency cannot be improved by simultaneous transmission in radio stations based on the IEEE 802.11ax standard, and the transmission efficiency of the entire system is reduced.

An object of the present invention is to provide a radio communication method, a centralized control station, and a base station, in which the base station includes a plurality of radio communication units individually supporting a plurality of communication capabilities, and controls a terminal station to be connected with the base station to select a radio communication unit according to a communication scheme of the terminal station.

Means for Solving the Problem

A first invention relates to a radio communication method of a radio communication system. The radio communication system includes a plurality of base stations mounted with a plurality of radio communication units for which different communication schemes are settable, a terminal station configured to perform radio communication with each of the plurality of radio communication units of each of the plurality of base stations in a certain communication scheme, and a centralized control station configured to control the plurality of base stations. The radio communication method includes calculating, by the centralized control station, a setting policy of a communication scheme for the radio communication unit of the base station and a switching policy for the terminal station and the radio communication unit, and notifying the base station of the policies, setting, by the base station, the setting policy and the switching policy, notified from the centralized control station, for the radio communication unit, collecting, by the base station, communication scheme information of communication schemes selectable by the terminal station from the terminal station to be connected, and selecting, by the base station, a radio communication unit to be connected by the terminal station in accordance with the communication scheme information, the setting policy, and the switching policy.

The radio communication method according to the first invention, further includes updating, by the centralized control station, the switching policy, based on the communication scheme information of the terminal station acquired from the base station, and notifying the base station of the updated switching policy, and updating, by the base station, a setting of the switching policy to the radio communication unit, with the notified update information of the switching policy.

The radio communication method according to the first invention, further includes updating, by the centralized control station, the setting policy, based on the communication scheme information of the terminal station acquired from the base station, and notifying the base station of the updated setting policy, and updating, by the base station, a setting of the communication scheme to the radio communication unit, with the notified update information of the setting policy.

In the radio communication method according to the first invention, the setting policy and the switching policy are set depending on adaptability to a particular specification of the IEEE 802.11ax standard.

A second invention relates to a centralized control station in a radio communication system. The radio communication system includes a plurality of base stations mounted with a plurality of radio communication units for which different communication schemes are settable, a terminal station configured to perform radio communication with each of the plurality of radio communication units of each of the plurality of base stations in a certain communication scheme, and a centralized control station configured to control the plurality of base stations. The centralized control station includes a collection mechanism configured to collect, via the base station, communication scheme information of communication schemes selectable by the terminal station, a calculation mechanism configured to calculate, based on the communication scheme information of the terminal station collected from the base station, a setting policy of a communication scheme for the radio communication unit of the base station and a switching policy for the terminal station and the radio communication unit, and a notification mechanism configured to notify the base station of the calculated setting policy and switching policy.

In the centralized control station according to the second invention, the centralized control station includes an update mechanism configured to update the setting policy and the switching policy, based on the communication scheme information of the terminal station collected by the base station from the terminal station.

A third invention relates to a base station in a radio communication system. The radio communication system includes a plurality of the base stations, a terminal station configured to perform radio communication in a certain communication scheme, and a centralized control station configured to control the plurality of base stations. The base station includes a plurality of radio communication units for which different communication schemes are settable, a collection and notification mechanism configured to collect, from the terminal station to be connected, communication scheme information of communication schemes selectable by the terminal station, and notify the centralized control station of the information, and a setting and selection mechanism configured to set a setting policy and a switching policy, notified from the centralized control station, for the radio communication unit, and select a radio communication unit to be connected by the terminal station in accordance with the communication scheme information, the setting policy, and the switching policy.

Effects of the Invention

In the present invention, the base station first characterizes, by using a setting policy of a communication scheme, a plurality of radio communication units for which different communication schemes are settable, and then connects a terminal station to a specified radio communication unit in accordance with a switching policy. Thus, the effect of each radio frame can be maximized and the transmission efficiency can be improved.

BRIEF DESCRIPTION OF DRAWINGS

FIG. 1 illustrates a configuration example of a radio communication system according to the present invention.

In FIG. 1, BSS-A includes a base station 10A including a plurality of radio communication units, first terminal stations 20A-1 and 20A-2, and second terminal stations 30A-1 and 30A-2 supporting a different standard or communication scheme from that of the first terminal stations 20A-1 and 20A-2, and the terminal stations are in a service area being a range where radio communication with the base station 10A is available. BSS-B includes a base station 10B having a similar configuration to that of the base station 10A, first terminal stations 20B-1 and 20B-2, and second terminal stations 30B-1 and 30B-2. Here, the number of BSSs may be two or more, and each of the BSSs may include one or more first terminal stations and second terminal stations. A centralized control station 50 is connected to the base stations 10A and 10B.

FIG. 2 illustrates configuration examples of the base station, the first/second terminal stations, and the centralized control station. In FIG. 2, the base station 10 includes an antenna 11, a plurality of radio communication units 12-1 to 12-n, a setting unit 13, an information collecting unit 14, and a network communication unit 15. Note that functional blocks typically mounted on a base station are omitted.

Figure 1:
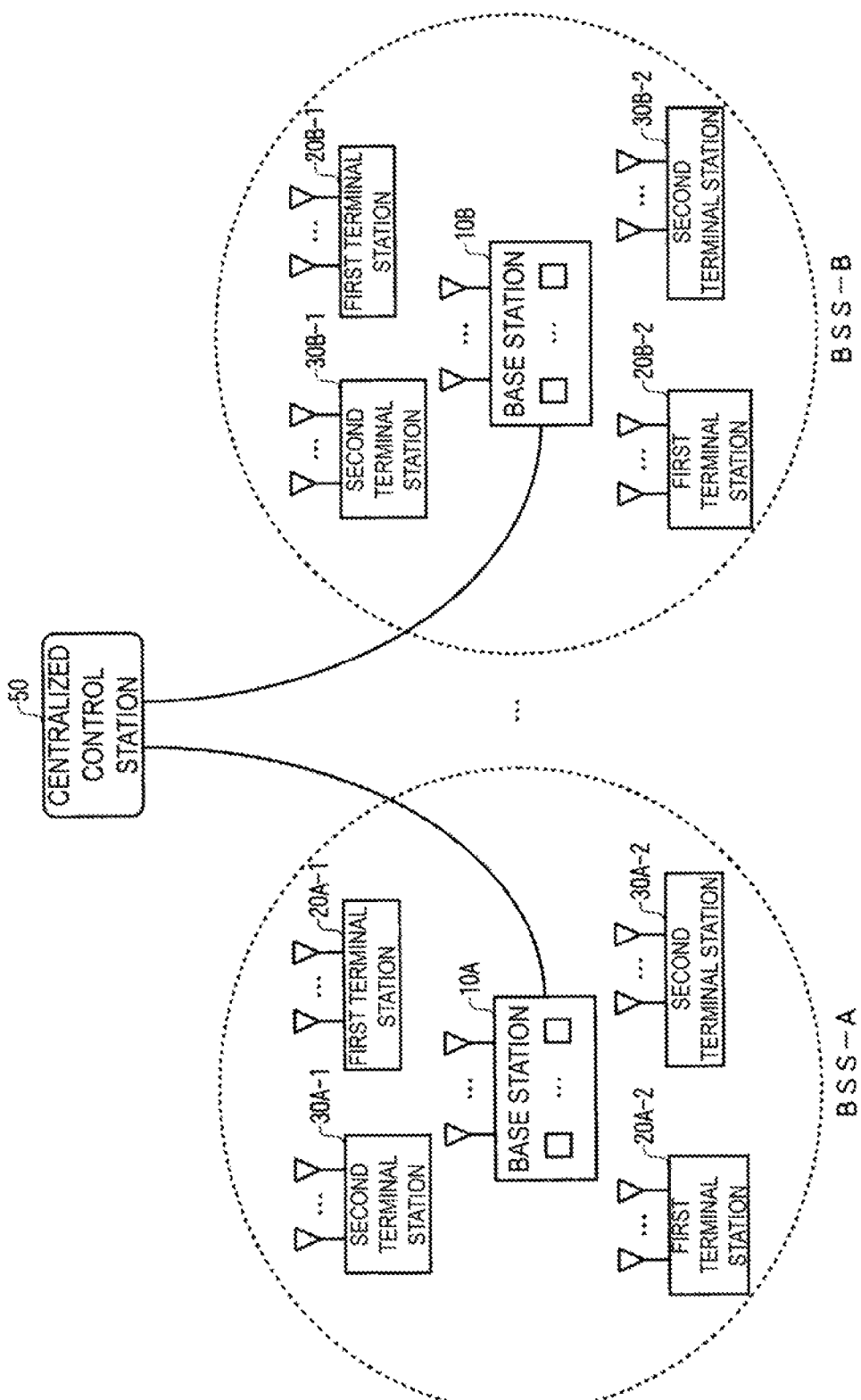
FIG. 1 is a diagram illustrating a configuration example of a radio communication system according to the present invention.

The antenna 11 is connected to the radio communication units 12-1 to 12-$n$, transmits a radio frame input from the radio communication units 12-1 to 12-$n$, and outputs a received radio frame to the radio communication units 12-1 to 12-$n$.

The radio communication units 12-1 to 12-$n$ have three functions including a radio communication function, a terminal station connection switching function, and an information collecting function. With the radio communication function, the radio communication units 12-1 to 12-$n$ independently performs radio communication, via the antenna 11, with a terminal station by using a standard or communication scheme set based on a setting policy input previously from the setting unit 13. With the terminal station connection switching function, connection switching between terminal stations is performed based on a switching policy of a connectable terminal station, the policy being input from the setting unit 13. With the information collecting function, information of standards or communication schemes selectable by a terminal station and connection information of a terminal station are collected, and then output to the information collecting unit 14.

The setting unit 13 receives, from the network communication unit 15, inputs of a setting policy for setting a standard or communication scheme for each of the radio communication units 12-1 to 12-$n$ and a switching policy for determining a radio communication unit to be connected by a terminal station, and then sets the policies to each of the radio communication units 12-1 to 12-$n$.

The information collecting unit 14 acquires the information of the standard or communication scheme for selecting a terminal station from each of the radio communication units 12-1 to 12-$n$ and the connection information of the terminal station, and then lists the information to output the information to the network communication unit 15.

The network communication unit 15 has two functions including a terminal station information notification function and a policy acquisition function. With the terminal station information notification function, the information of the standard or communication scheme for selecting a terminal station and the connection information of the terminal station acquired by the information collecting unit 14 are notified to the centralized control station 50 via a network. With the policy acquisition function, a setting policy of a standard or communication scheme to be set for each of the radio communication units 12-1 to 12-$n$ and a switching policy for determining a radio communication unit to be connected by a terminal station are acquired from the centralized control station 50 via a network, and are output to the setting unit 13.

The first terminal station 20 includes an antenna 21, a radio communication unit 22, and a standard/communication scheme notification unit 23. Note that functional blocks typically mounted on a terminal station are omitted.

The antenna 21 is connected to the radio communication unit 22, transmits a radio frame input from the radio communication unit 22, and outputs a received radio frame to the radio communication unit 22. The standard/communication scheme notification unit 23 outputs information of standards or communication schemes selectable by the first terminal station 20 to the radio communication unit 22, and the radio communication unit 22 transmits the information in a radio packet.

The second terminal station 30 also has a similar configuration, but differs from the first terminal station 20 in the standard or communication scheme. For example, the first terminal station 20 supports the IEEE 802.11ax standard, and the second terminal station 30 supports the standard prior to the IEEE 802.11ac.

The centralized control station 50 includes a network communication unit 51 and a policy unit 52. Note that functional blocks typically mounted on a centralized control station are omitted.

The network communication unit 51 has two functions including an information collecting function and a policy notification function. With the information collecting function, the information of the standard or communication scheme for selecting a terminal station and the connection information of the terminal station are acquired via a network from the network communication unit 15 of the base station 10. With the policy notification function, the setting policy of setting the standard or communication scheme for each of the radio communication units 12-1 to 12-$n$ of the base station 10 and the switching policy for determining a radio communication unit to be connected by the terminal station are acquired from the policy unit 52, and are informed to the base station 10 via a network.

The policy unit 52 calculates, based on the information of the standards or communication schemes selectable by the terminal station and the connection information of the terminal station that are input from the network communication unit 51, a setting policy of a standard or communication scheme to be set for each of the radio communication units 12-1 to 12-$n$ of the base station 10 and a switching policy for determining a radio communication unit to be connected by the terminal station, and then outputs the policies to the network communication unit 51.

Figure 3:
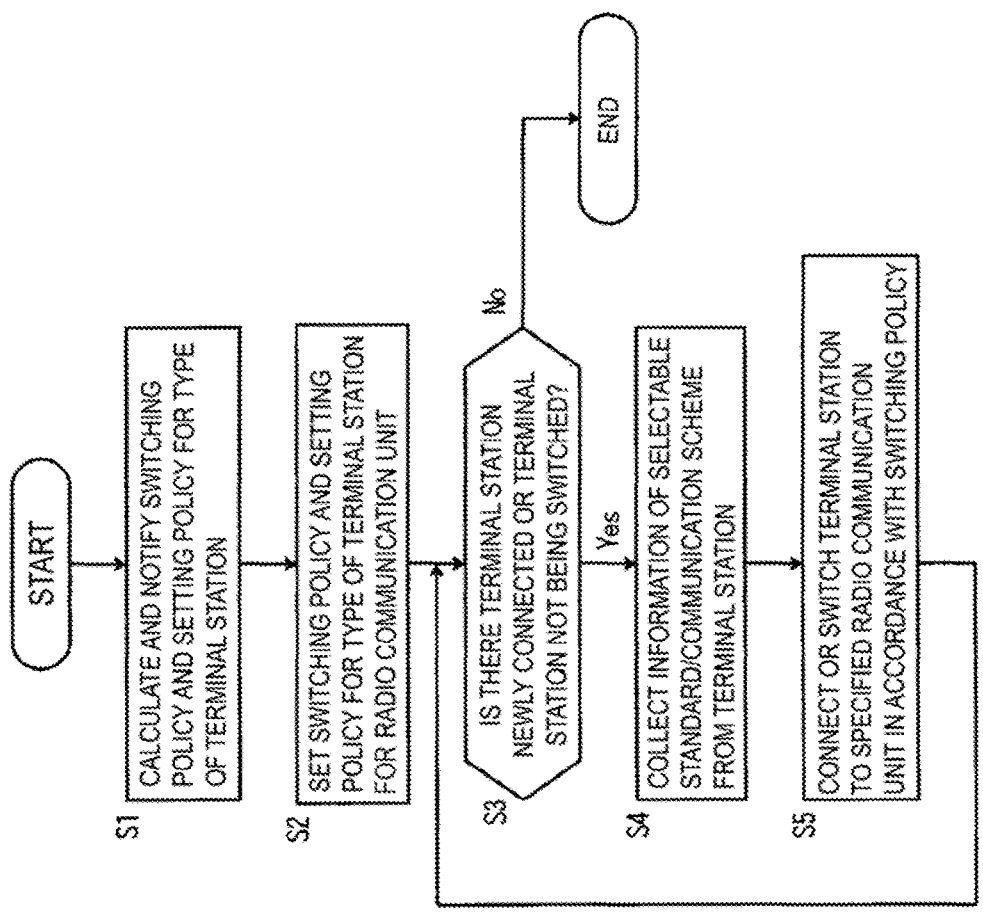
FIG. 3 is a flowchart illustrating an example of a control procedure based on a setting policy and a switching policy according to the present invention.

FIG. 3 illustrates an example of a control procedure based on a setting policy and a switching policy according to the present invention.

Here, in a conventional radio communication system, a terminal station to be connected to the base station 10 randomly selects and connects to the radio communication units 12-1 to 12-$n$ of the base station 10. In the present invention, in order to specify a radio communication unit to be connected by a terminal station, control is performed using a setting policy and a switching policy that are set for each of the radio communication units.

Figure 2:
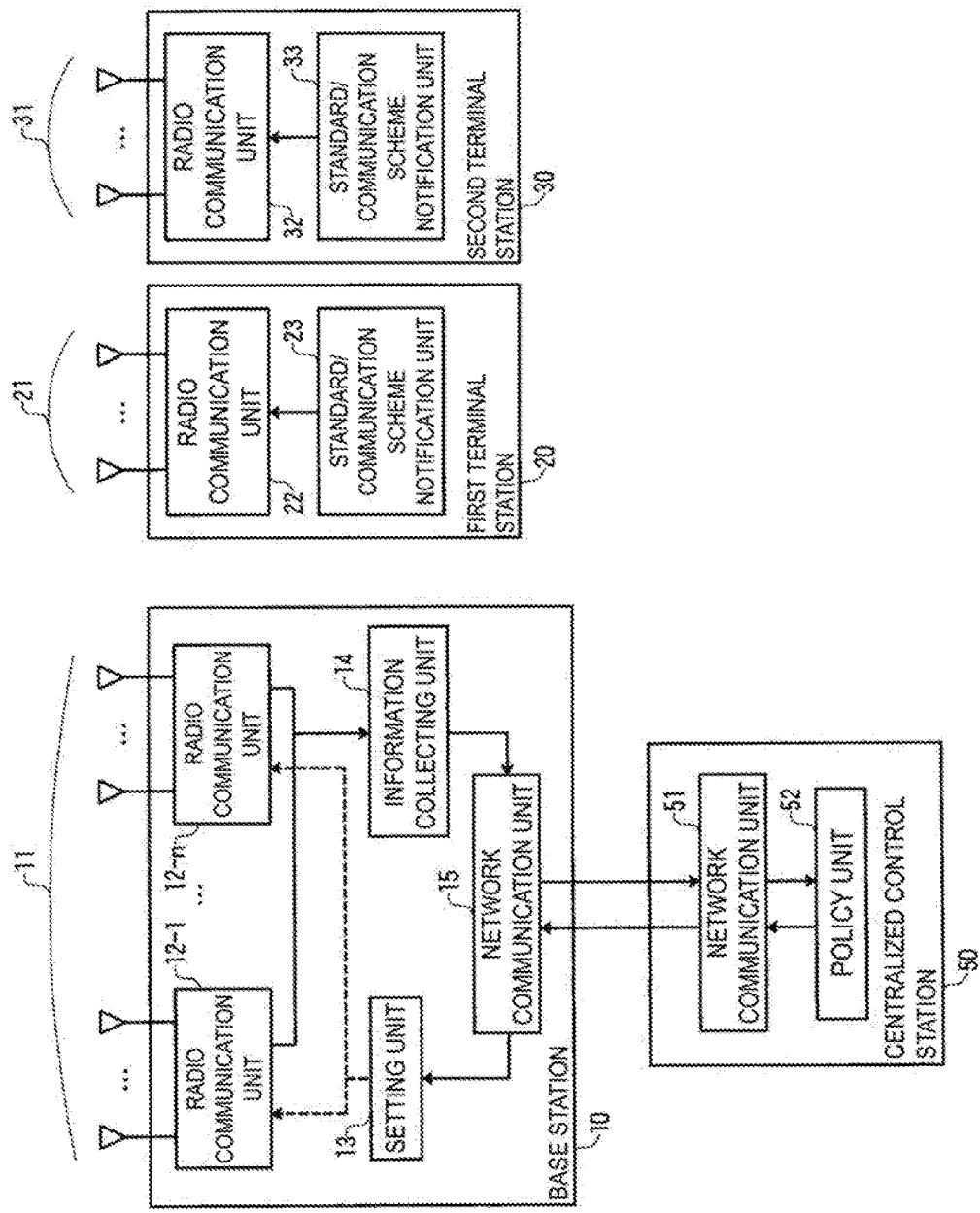
FIG. 2 is a diagram illustrating configuration examples of a base station, first/second terminal stations, and a centralized control station.

In FIG. 1 to FIG. 3, the policy unit 52 of the centralized control station 50 calculates a switching policy and a setting policy for the type of terminal station to notify subordinate base stations 10A and 10B of the policies (S1). The base stations 10A and 10B each set, for the radio communication units 12-1 to 12-$n$, the notified switching policy and setting policy for the type of terminal station (S2).

Next, the base stations 10A and 10B determine whether or not there is a terminal station which is newly connected or a terminal station which has not been switched (S3), and if there are any, collect information of selectable standards or communication schemes from the terminal station (S4), connect or switch the terminal station to a specified radio communication unit in accordance with the switching policy (S5), and then repeats these steps until there is no terminal station which has not been switched to finish the procedure.

Note that in a specific switching method of switching a connection destination of the terminal stations 20 and 30 to another radio communication unit 12, the base station 10 transmits a Deauthentication frame, a Disassociation frame, or the like to disconnect the radio connection with the terminal stations 20 and 30, and the base station 10 can instruct the terminal stations to ignore or reject a reconnection request to a radio communication unit other than the radio communication unit being a connection destination after switching, or to reconnect to a specified radio communication unit.

Here, examples of the type of terminal station, the setting policy, and the switching policy will be described with reference to FIG. 4.

Figure 4:
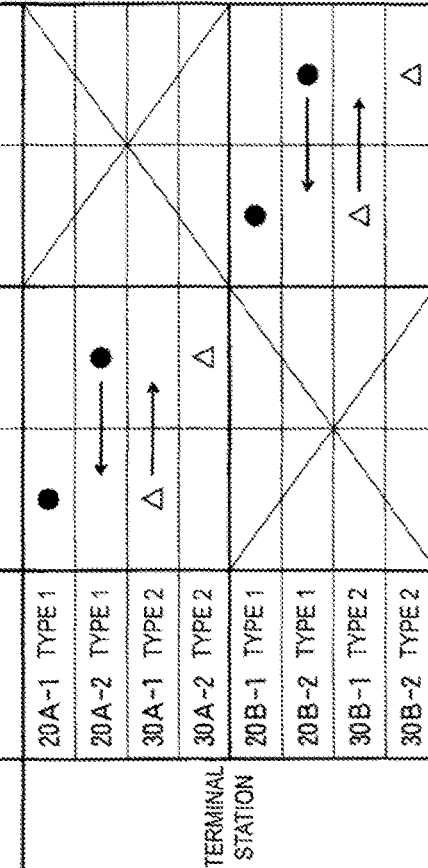
FIG. 4 is a set of tables showing examples of a type of terminal station, a setting policy and a switching policy of a radio communication unit of a base station.

The table (1) of FIG. 4 shows types of terminal station.

It is shown that in a case where a terminal station is adaptable to the OBSS-PD scheme in the IEEE 802.11ax standard, if a signal transmitted to another terminal station belonging to a different Basic Service Set (BSS) and supporting the IEEE 802.11ax is detected in a carrier sense before starting transmission to the terminal station, transmission can be simultaneously started after a carrier detection threshold value and a transmission power value are controlled. In a case where a terminal station is adaptable to the Spatial Reuse Parameter (SRP) scheme, transmission can be simultaneously started based on SRP of a previously transmitted frame after transmission power and the like of the terminal station are controlled. Here, a terminal station is defined as type 1 if adaptable (o) to the OBSS-PD scheme, and type 2 if not adaptable (x).

The table (2) of FIG. 4 shows examples of the setting policy and the switching policy. A setting policy 1 corresponds to type 1 of terminal station, in which OBS S-PD is effective, and a parameter such as a frequency channel and a bandwidth is specified. A setting policy 2 corresponds to type 2 of terminal station, in which OBSS-PD is not effective, and a parameter such as a frequency channel and a bandwidth is specified. Here, the setting policy 1 is applied to the radio communication unit 12-1 of each of the base stations, and the setting policy 2 is applied to the radio communication unit 12-2 of each of the base stations.

A switching policy 1 for connecting a type 1 terminal station is applied to the radio communication unit 12-1 of each of the base stations. A switching policy 2 for connecting a type 2 terminal station is applied to the radio communication unit 12-2 of each of the base stations. Thus, in the base station 10A, if a type 1 first terminal station 20A-1 is connected to the radio communication unit 12-1 set with the switching policy 1, then switching is not performed (●), and if a type 2 second terminal station 30A-1 is connected to the radio communication unit 12-1, then switching to the radio communication unit 12-2 to which the type 2 (setting policy 2) is applied is performed (□). If a type 2 second terminal station 30A-2 is connected to the radio communication unit 12-2 set with the switching policy 2, then switching is not performed (□), and if a type 1 first terminal station 20A-2 is connected, then switching to the radio communication unit 12-1 to which the type 1 (setting policy 1) is applied is performed (●). The same applies to the base station 10B.

Figure 5:
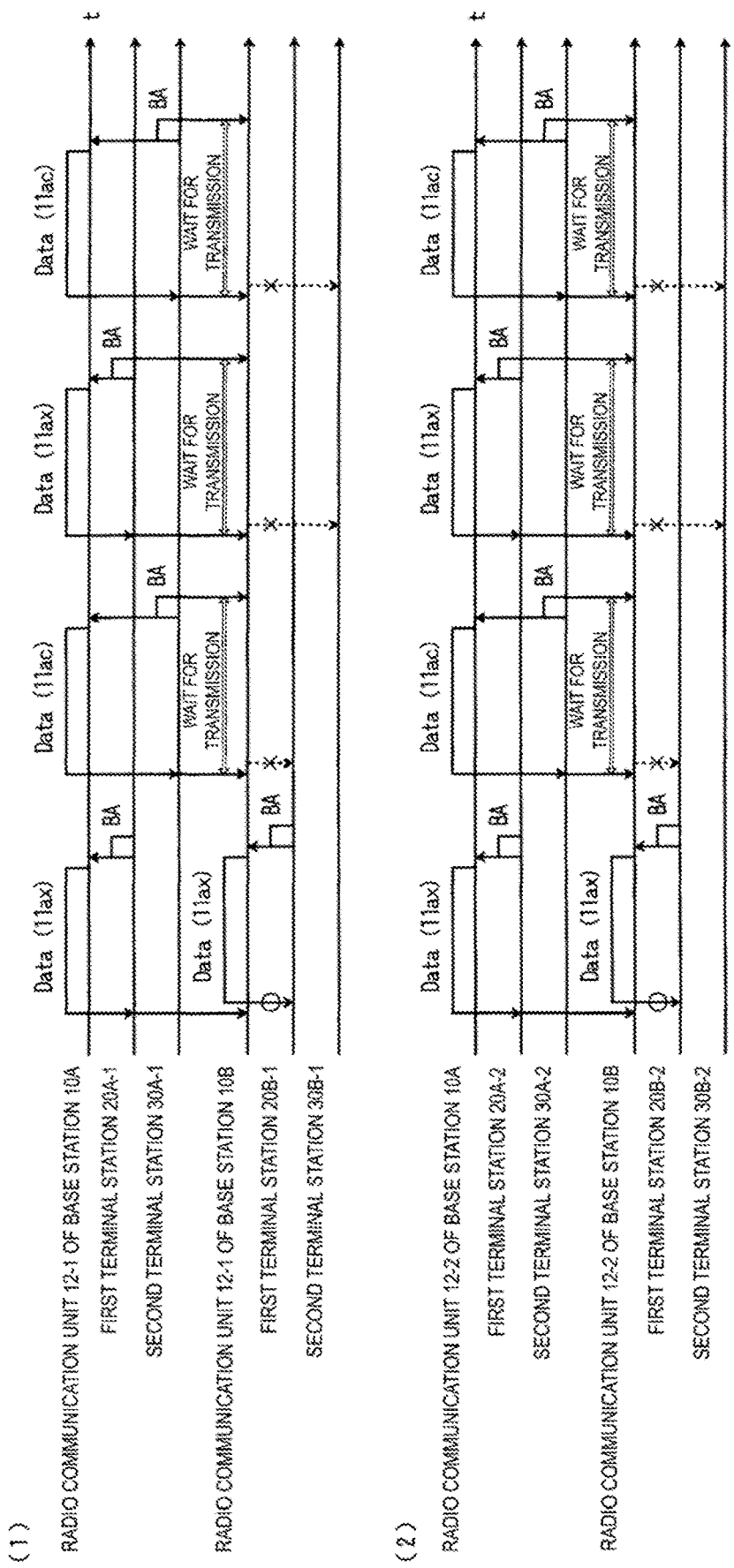
FIG. 5 is a set of time charts illustrating application examples of OBSS-PD before switching based on the switching policy.

FIG. 5 illustrates examples in which OBSS-PD is applied before switching based on the switching policy.

Here, a case is illustrated where downlink traffic from a base station to a terminal station is assumed, the base station 10A starts transmission first, and immediately thereafter the base station 10B attempts to start transmission. Note that a case where the base station 10B starts transmission first, and immediately thereafter the base station 10A attempts to start transmission shows a similar result except the communication order of the base stations changes, and thus the explanation for this case will be omitted.

In the time chart (1) of FIG. 5, the base station 10A and the base station 10B can perform simultaneous transmission only when the base station 10A starts transmission to the first terminal station 20A-1, and immediately thereafter the base station 10B starts transmission to the first terminal station 20B-1. In any other combinations, the base stations 10A and 10B cannot perform simultaneous transmission.

In the time chart (2) of FIG. 5, the base station 10A and the base station 10B can perform simultaneous transmission when the base station 10A starts transmission to the first terminal station 20A-2, and immediately thereafter the base station 10B starts transmission to the first terminal station 20B-2. The base stations 10A and 10B cannot perform simultaneous transmission for any other combinations.

As such, in a situation where terminal stations of different types coexist and are randomly accommodated in one radio communication unit, simultaneous transmission based on OBSS-PD in the IEEE 802.11ax standard may not be sufficiently performed.

Figure 6:
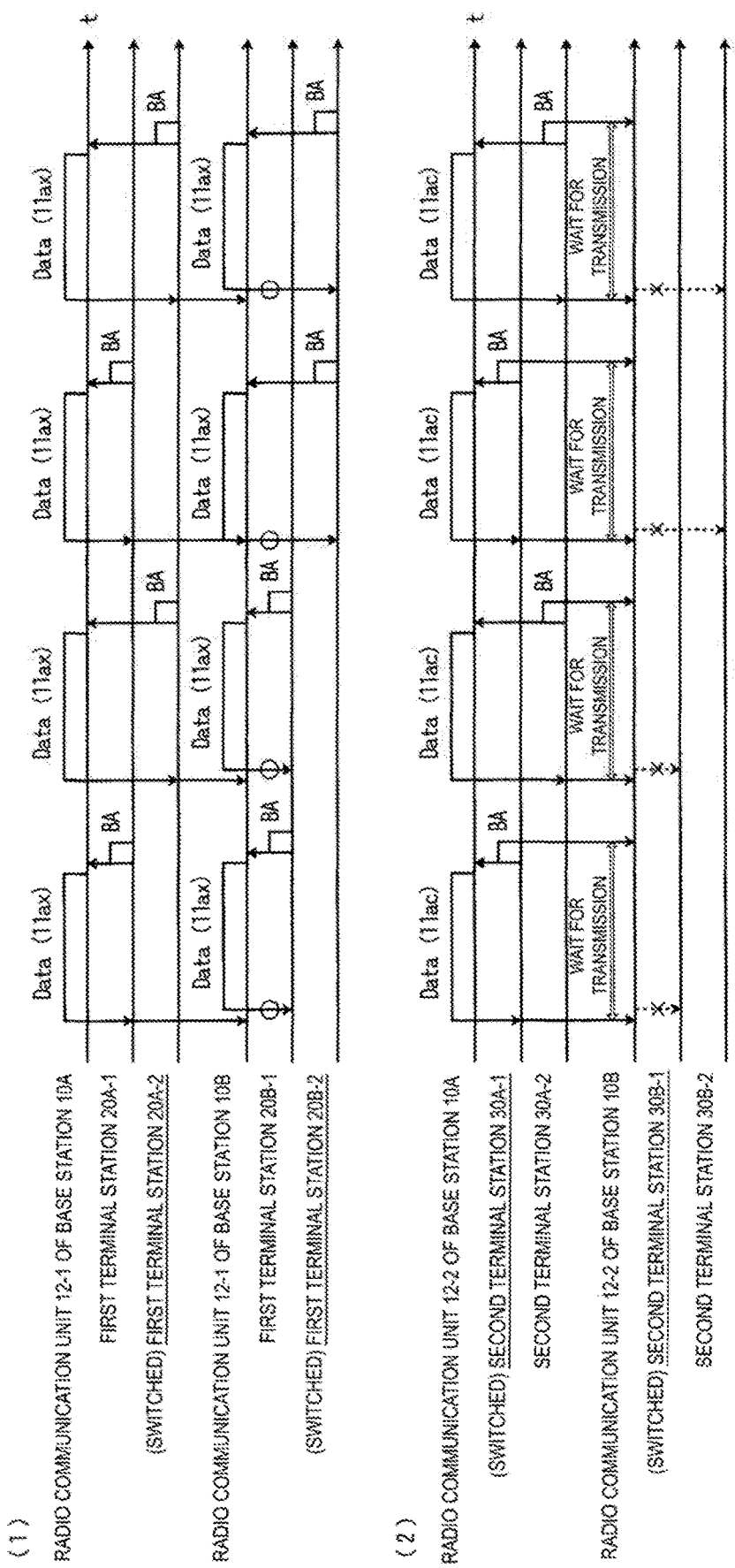
FIG. 6 is a set of time charts illustrating application examples of OBSS-PD after switching based on the switching policy.

FIG. 6 illustrates examples in which OBSS-PD is applied after switching based on the switching policy.

In the time chart (1) of FIG. 6, terminal stations connected to the radio communication unit 12-1 of the base station 10A are the first terminal stations 20A-1 and 20A-2 which are all of type 1, and terminal stations connected to the radio communication unit 12-1 of the base station 10B are the first terminal stations 20B-1 and 20B-2 which are all of type 1. All of the terminal stations are adaptable to the OBSS-PD scheme, and thus, the base stations 10A and 10B can perform simultaneous transmission in the four combinations of the terminal stations. Compared to the time charts before switching illustrated in FIG. 5, the opportunity increases for the base stations 10A and 10B to perform simultaneous transmission based on the OBSS-PD scheme.

In the time chart (2) of FIG. 6, terminal stations connected to the radio communication unit 12-2 of the base station 10A and the base station 10B are all of type 2, and thus, simultaneous transmission based on the OBSS-PD scheme cannot be performed in any combination of the terminal stations. The same applies to type 2 terminal stations before switching based on the switching policy.

Figure 7:
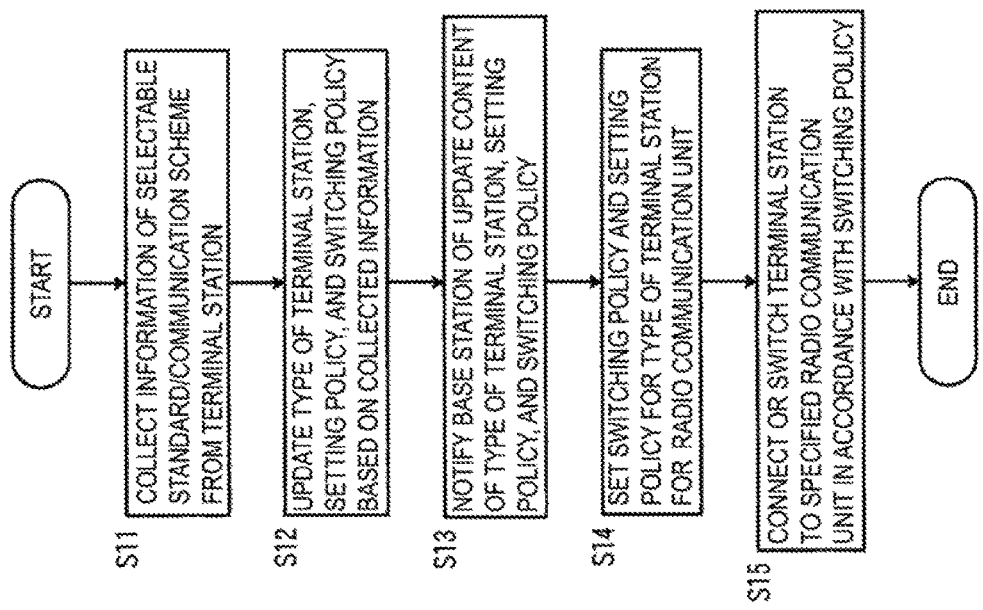
FIG. 7 is a flowchart illustrating an example of an update procedure of the setting policy and the switching policy according to the present invention.

FIG. 7 illustrates an example of an update procedure of the setting policy and the switching policy according to the present invention.

In FIG. 7, the centralized control station 50 collects information of selectable standards or communication schemes from the first terminal station 20 and the second terminal station 30 of each of the base stations 10 (S11), and updates, based on the collected information, the type of terminal station, the setting policy, and the switching policy, if necessary (S12). Next, if any one of the type of terminal station, the setting policy, and the switching policy is updated, the centralized control station 50 notifies (S13) the subordinate base station 10 of the update content. The base station 10 receiving the notification sets the update content for the radio communication units 12-1 to 12-*n* of the base station 10 (S14). Each of the radio communication units 12-1 to 12-*n* connects or switches the terminal station to a specified radio communication unit based on setting content of the setting policy and the switching policy (S15).

Figure 8:
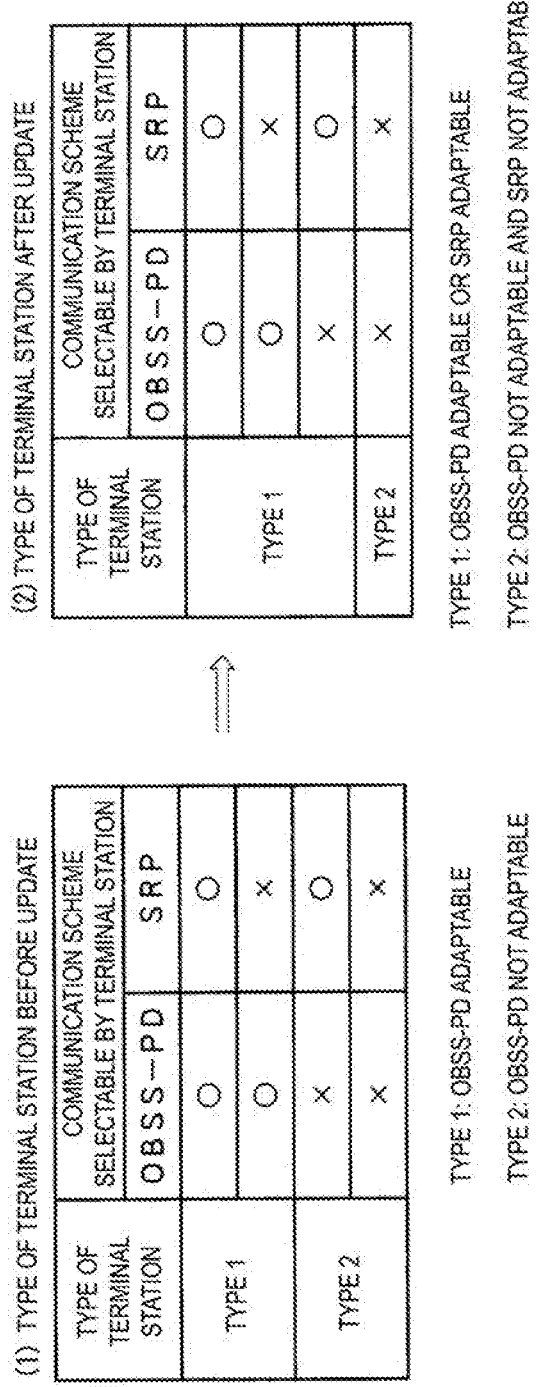
FIG. 8 is a set of tables showing an update example of a type of terminal station. Description of Embodiments

FIG. 8 shows an update example of a type of terminal station.

The table (1) of FIG. 8 shows a type of terminal station before update, which is the same as the type of terminal station showed in the table (1) of FIG. 4. A terminal station adaptable to OBSS-PD is classified into type 1 and a terminal station not adaptable to OBSS-PD is classified into type 2.

The table (2) of FIG. 8 shows a type of terminal station after update, and a terminal station adaptable to SRP is also newly defined as type 1. In other words, a terminal station that is adaptable to OBSS-PD or adaptable to SRP is defined as type 1, and a terminal station that is not adaptable to OBSS-PD and not adaptable to SRP is defined as type 2. A new communication scheme not used for the classification of terminal stations before update may be added for classification.

Thus, the setting policy 1 corresponds to the type 1 of terminal station, in which OBSS-PD is effective or SRP is effective. The setting policy 2 corresponds to the type 2 of terminal station, in which OBSS-PD is not effective and SRP is not effective. In the above example, the setting policy 1 is applied to the radio communication unit 12-1 of each of the base stations, and the setting policy 2 is applied to the radio communication unit 12-2 of each of the base stations.

For the switching policy 1 for connecting a type 1 terminal station and the switching policy 2 for connecting a type 2 terminal station, similar processing of switching a terminal station in the radio communication unit is applied except the content of the type of terminal station is updated.

The switching policy may include, in addition to a type of terminal station, a new determination as to whether or not a terminal station is a priority terminal, for example. If the terminal station is a priority terminal, even when the terminal station is of type 2, the terminal station is switched to a corresponding radio communication unit as in the case of a type 1 terminal station. Information such as a connection time, traffic, or a communication application may be employed for the switching policy.

REFERENCE SIGNS LIST 10A, 10B Base station
11 Antenna
12 Radio communication unit
13 Setting unit
14 Information collecting unit
15 Network communication unit
20A, 20B First terminal station
21 Antenna
22 Radio communication unit
23 Standard/communication scheme notification unit
30A, 30B Second terminal station
31 Antenna
32 Radio communication unit
33 Standard/communication scheme notification unit
50 Centralized control station
51 Network communication unit
52 Policy unit

The invention claimed is:

1. A radio communication method of a radio communication system, the radio communication system including:
   a plurality of base stations mounted with a plurality of radio communication units for which different communication schemes are settable;
   a terminal station configured to perform radio communication with each of the plurality of radio communication units of each of the plurality of base stations in a certain communication scheme; and
   a centralized control station configured to control the plurality of base stations, the method comprising:
   calculating, by the centralized control station, a setting policy of a communication scheme for the radio communication unit of the base station and a switching policy for the terminal station and the radio communication unit, and notifying the base station of the policies;
   setting, by the base station, the setting policy and the switching policy, notified from the centralized control station, for the radio communication unit;
   collecting, by the base station, communication scheme information of communication schemes selectable by the terminal station from the terminal station to be connected; and
   selecting, by the base station, a radio communication unit to be connected by the terminal station in accordance with the communication scheme information, the setting policy, and the switching policy.

2. The radio communication method according to claim 1, further comprising:
   updating, by the centralized control station, the switching policy, based on the communication scheme information of the terminal station acquired from the base station, and notifying the base station of the updated switching policy; and
   updating, by the base station, a setting of the switching policy to the radio communication unit, with the notified update information of the switching policy.

3. The radio communication method according to claim 2, wherein the setting policy and the switching policy are set depending on adaptability to a particular specification of the IEEE 802.11ax standard.

4. The radio communication method according to claim 2, further comprising:
   updating, by the centralized control station, the setting policy, based on the communication scheme information of the terminal station acquired from the base station, and notifying the base station of the updated setting policy; and
   updating, by the base station, a setting of the communication scheme to the radio communication unit, with the notified update information of the setting policy.

5. The radio communication method according to claim 4, wherein the setting policy and the switching policy are set depending on adaptability to a particular specification of the IEEE 802.11ax standard.

6. The radio communication method according to claim 1, wherein the setting policy and the switching policy are set depending on adaptability to a particular specification of the IEEE 802.11ax standard.

7. A centralized control station in a radio communication system, the radio communication system including:
   a plurality of base stations mounted with a plurality of radio communication units for which different communication schemes are settable;
   a terminal station configured to perform radio communication with each of the plurality of radio communication units of each of the plurality of base stations in a certain communication scheme; and
   the centralized control station configured to control the plurality of base stations,
   wherein the centralized control station includes:
   a collection mechanism configured to collect, via the base station, communication scheme information of communication schemes selectable by the terminal station;
   a calculation mechanism configured to calculate, based on the communication scheme information of the terminal station collected from the base station, a setting policy of a communication scheme for the radio communication unit of the base station and a switching policy for the terminal station and the radio communication unit; and a notification mechanism configured to notify the base station of the calculated setting policy and switching policy.

8. The centralized control station according to claim 7, wherein the centralized control station includes an update mechanism configured to update the setting policy and the switching policy, based on the communication scheme information of the terminal station collected by the base station from the terminal station.

9. A base station in a radio communication system, the radio communication system including:
- a plurality of the base stations;
- a terminal station configured to perform radio communication in a certain communication scheme; and
- a centralized control station configured to control the plurality of base stations, wherein the base station comprises:
- a plurality of radio communication units for which different communication schemes are settable;
- a collection and notification mechanism configured to collect, from the terminal station to be connected, communication scheme information of communication schemes selectable by the terminal station, and notify the centralized control station of the information; and
- a setting and selection mechanism configured to set a setting policy and a switching policy, notified from the centralized control station, for the radio communication unit, and select a radio communication unit to be connected by the terminal station in accordance with the communication scheme information, the setting policy, and the switching policy.

* * * * *